G. A. DABNEY, OF SAN JOSÉ, CALIFORNIA.

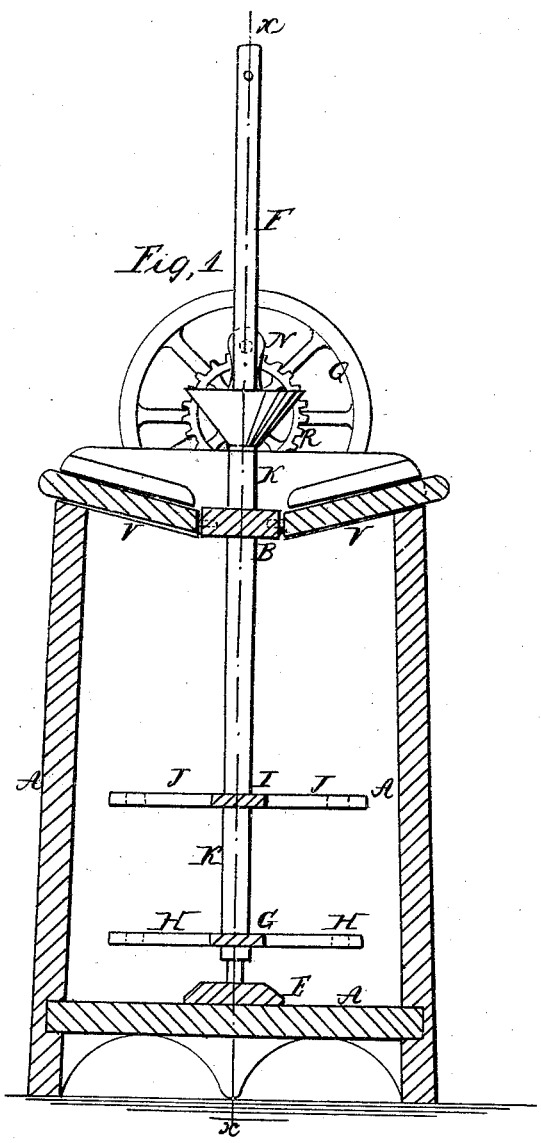
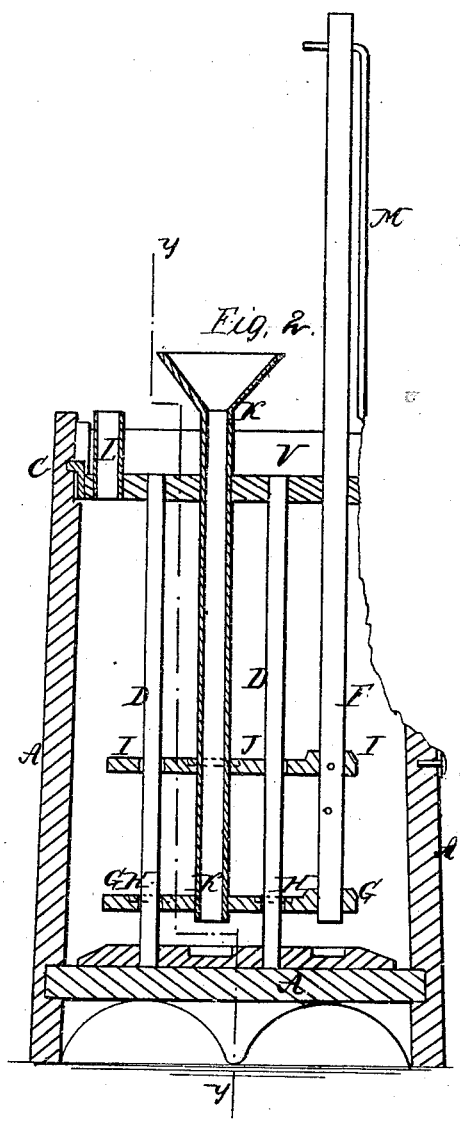

Letters Patent No. 86,371, dated February 2, 1869.

IMPROVEMENT IN CHURNS.

The Schedule referred to in these Letters Patent and making part of the same.

*To all whom it may concern:*

Be it known that I, G. A. DABNEY, of San José, in the county of Santa Clara, and State of California, have invented a new and useful Improvement in Churns; and I do hereby declare that the following is a full, clear, and exact description thereof, which will enable those skilled in the art to make and use the same, reference being had to the accompanying drawings, forming part of this description, in which—

Figure 1 is a vertical section of my improved churn, taken through the line *y y*, fig. 2.

Figure 2 is a vertical section of the same, taken through the line *x x*, fig. 1.

Similar letters of reference indicate corresponding parts.

My invention has for its object to furnish an improved churn, which shall be simple in construction, and effective in operation, performing its work rapidly, thoroughly, and with the greatest ease to the operator; and It consists in the construction and combination of the various parts, as hereinafter more fully described.

A is the body of the churn, which may be of any desired size, according to the amount of churning to be done.

A convenient size of the body A, for ordinary purposes, is twenty inches high upon two sides, and twenty-two inches high upon the other two sides.

The body A should be slightly tapering, being eleven by thirteen inches square at the bottom, and ten by eleven inches square at the top.

B is a cross-bar, the ends of which are notched to fit upon the guide-irons C, attached to the inner sides of the upper part of the body A.

To the cross-bar B are attached the upper ends of the guide-rods D, the lower ends of which rest in sockets, formed in the bar E, permanently attached to the bottom of the body A.

F is the dasher-handle, which passes up through a hole in the cross-bar B, and to the lower end of which is attached a horizontal arm, G, having holes formed through it, through which the guide-rods D pass.

H are two cross-arms, having holes or perforations through their ends, and which are securely attached to the arm G, near its ends, so as to project equally upon each side of said arm G, as shown in fig. 1.

I is an arm, similar to the arm G, and which is adjustably attached to the dasher-handle F, so that it may be moved up and down upon the said handle, to adjust its position to the quantity of milk in the churn.

The arm I is provided with an arm, J, attached at its middle part to the middle part of the arm I.

The ends of the cross-arm J have holes formed through them, as shown in fig. 1.

K is a tube, which passes down through the centre of the cross-bar B, through the centre of the adjustable arm I, and through the centre of the arm G, to which it is secured, so as to be raised and lowered with the dasher.

The upper end of the tube K is made funnel-shaped, for convenience in pouring hot or cold water into the churn, which may thus be introduced into the lower part of the milk.

L is a small tube, attached to one end of the cross-bar B, and projecting about two inches above the said bar B, for the passage of air while the churn is being operated.

If desired, the pipe L may be omitted, and a hole simply formed through the said bar, but in this case the hole should be covered with fine wire cloth, to prevent the milk from spattering out.

To the upper end of the dasher-handle F is attached the upper end of the connecting-rod or pitman M, by means of a hook, formed upon the upper end of the said pitman, which passes through a hole in the upper end of the said handle.

Upon the lower end of the pitman M is formed a similar hook, which passes through a hole in the end of the crank-arm N, attached to the end of the shaft O, so that the dasher may be readily disconnected from the gearing, allowing the dasher and the frame in which it works, to be easily removed from the churn, when desired.

P is a frame, formed by two parallel bars, which are securely bolted to each other at a proper distance apart, and which should be detachably secured to the side of the churn-body A, so that it may be easily and quickly removed for convenience in cleaning the churn.

The shaft O revolves in bearings in the frame P, and to its outer end is attached the fly-wheel Q.

To the shaft O, between the bars of the frame P, is attached a gear-wheel, R, into the teeth of which mesh the teeth of the gear-wheel S, attached to the shaft T, which revolves in bearings in the frame P, and to the outer end of which is attached the crank, U, by means of which the churn is operated.

V are the side parts of the top or cover of the churn, the ends of which slide in grooves in the inner sides of the upper ends of the higher sides of the churn, said grooves being made inclined, so as to make the cover concave, as shown in fig. 1.

The inner edges of the boards V are connected with the edges of the bar B, which forms the middle part of the cover, by dowel-pins, as shown in fig. 1.

I claim as new, and desire to secure by Letters Patent—

The combination of the dasher-handle F, lower dasher G H, adjustable upper dasher I J, tube K, and detachable guide-frame B D, with each other, substantially as herein shown and described, and for the purpose set forth.

G. A. DABNEY.

Witnesses:
JAS. F. HANCOCK,
P. H. WARD.